United States Patent
Fouli et al.

(10) Patent No.: US 11,418,449 B2
(45) Date of Patent: Aug. 16, 2022

(54) MULTIPATH CODING APPARATUS AND RELATED TECHNIQUES

(71) Applicant: Code On Network Coding, LLC, Cambridge, MA (US)

(72) Inventors: Kerim Fouli, Cambridge, MA (US); Muriel Medard, Belmont, MA (US)

(73) Assignee: Code On Network Coding, LLC, Cambridge, MA (US)

( * ) Notice: Subject to any disclaimer, the term of this patent is extended or adjusted under 35 U.S.C. 154(b) by 0 days.

(21) Appl. No.: 17/055,160

(22) PCT Filed: May 16, 2019

(86) PCT No.: PCT/US2019/032625
§ 371 (c)(1),
(2) Date: Nov. 13, 2020

(87) PCT Pub. No.: WO2019/222472
PCT Pub. Date: Nov. 21, 2019

(65) Prior Publication Data
US 2021/0203603 A1     Jul. 1, 2021

Related U.S. Application Data

(60) Provisional application No. 62/672,551, filed on May 16, 2018.

(51) Int. Cl.
*H04L 1/06*          (2006.01)
*H04L 47/125*        (2022.01)
(Continued)

(52) U.S. Cl.
CPC ............ *H04L 47/125* (2013.01); *H04L 45/24* (2013.01); *H04L 45/74* (2013.01)

(58) Field of Classification Search
CPC ... H04L 1/0041; H04L 1/0045; H04L 1/0057; H04L 2001/0096; H04L 45/24; H04L 45/74; H04L 47/125
See application file for complete search history.

(56) References Cited

U.S. PATENT DOCUMENTS 5,577,056 A    11/1996  Malik et al.
5,870,412 A     2/1999  Schuster et al.
(Continued)

FOREIGN PATENT DOCUMENTS

EP     1 638 239 A1    3/2006
EP       3252978     12/2017
(Continued)

OTHER PUBLICATIONS

"Data Service Options for Spread Spectrum Systems: Radio Link Protocol Type 3;" 3GPP2 C.S0017-010-A; Version 2.0; Sep. 2005.
(Continued)

*Primary Examiner* — Phuc H Tran
(74) *Attorney, Agent, or Firm* — Daly, Crowley, Mofford & Durkee, LLP

(57) ABSTRACT

Multipath coding systems, devices and methods are disclosed. In a multipath network, devices and methods generate at least one of a plurality of uncoded packets for transmission on a first path from a source node to a destination node as well as at least one coded packet based upon a set of uncoded packets for transmission on a second path from the source node to the destination node. The set of uncoded packets are formed, generated or otherwise provided from a next uncoded packet to be transmitted, a number ($\alpha$) of previously transmitted uncoded packets, and a number ($\beta$) of uncoded packets that are to be transmitted after the next uncoded packet and $\alpha+\beta$ is greater than zero.

(Continued)

The destination node operates to receive, and decode as needed, the uncoded and coded packets.

21 Claims, 8 Drawing Sheets

(51) Int. Cl.
*H04L 45/24* (2022.01)
*H04L 45/74* (2022.01)

(56) References Cited

U.S. PATENT DOCUMENTS

| | | | |
|---|---|---|---|
| 6,128,773 | A | 10/2000 | Snider |
| 6,621,851 | B1 | 9/2003 | Agee et al. |
| 6,885,653 | B2 | 4/2005 | Choi et al. |
| 7,064,489 | B2 | 6/2006 | Price |
| 7,071,853 | B2 | 7/2006 | Price |
| 7,095,343 | B2 | 8/2006 | Xie et al. |
| 7,164,691 | B2 | 1/2007 | Knapp et al. |
| 7,283,564 | B2 | 10/2007 | Knapp et al. |
| 7,349,440 | B1 | 3/2008 | Chou et al. |
| 7,408,938 | B1 | 8/2008 | Chou et al. |
| 7,414,978 | B2 | 8/2008 | Lun et al. |
| 7,529,198 | B2 | 5/2009 | Jain et al. |
| 7,706,365 | B2 | 4/2010 | Effros et al. |
| 7,760,728 | B2 | 7/2010 | Chou et al. |
| 7,821,980 | B2 | 10/2010 | Chakrabarti et al. |
| 7,876,677 | B2 | 1/2011 | Cheshire |
| 7,912,003 | B2 | 3/2011 | Radunovic et al. |
| 7,945,842 | B2 | 5/2011 | He |
| 8,040,836 | B2 | 10/2011 | Wu et al. |
| 8,068,426 | B2 | 11/2011 | Sundararajan et al. |
| 8,130,776 | B1 | 3/2012 | Sundararajan et al. |
| 8,279,781 | B2 | 10/2012 | Lucani et al. |
| 8,451,756 | B2 | 5/2013 | Lucani et al. |
| 8,482,441 | B2 | 7/2013 | Medard et al. |
| 8,504,504 | B2 | 8/2013 | Liu |
| 8,571,214 | B2 | 10/2013 | Lima et al. |
| 8,780,693 | B2 | 7/2014 | Kim et al. |
| 9,019,643 | B2 | 4/2015 | Medard et al. |
| 9,025,607 | B2 | 5/2015 | Zeger et al. |
| 9,137,492 | B2 | 9/2015 | Lima et al. |
| 9,143,274 | B2 | 9/2015 | Zeger et al. |
| 9,160,687 | B2 | 10/2015 | Haeupler et al. |
| 9,185,529 | B2 | 11/2015 | Medard et al. |
| 9,253,608 | B2 | 2/2016 | Medard et al. |
| 9,271,123 | B2 | 2/2016 | Medard et al. |
| 9,294,113 | B2 | 3/2016 | Feizi-Khankandi et al. |
| 9,361,936 | B2 | 6/2016 | Medard et al. |
| 9,369,255 | B2 | 6/2016 | Medard et al. |
| 9,369,541 | B2 | 6/2016 | Medard et al. |
| 9,537,759 | B2 | 1/2017 | Calmon et al. |
| 9,544,126 | B2 | 1/2017 | Zeger et al. |
| 9,559,831 | B2 | 1/2017 | Zeger et al. |
| 9,607,003 | B2 | 3/2017 | Medard et al. |
| 10,841,205 | B2 * | 11/2020 | Kucera ............... H04L 69/163 |
| 2003/0055614 | A1 | 3/2003 | Pelikan |
| 2003/0214951 | A1 | 11/2003 | Joshi et al. |
| 2004/0203752 | A1 | 10/2004 | Wojaczynski et al. |
| 2005/0010675 | A1 | 1/2005 | Jaggi et al. |
| 2005/0078653 | A1 | 4/2005 | Agashe et al. |
| 2005/0152391 | A1 | 7/2005 | Effros et al. |
| 2005/0251721 | A1 | 11/2005 | Ramesh et al. |
| 2006/0020560 | A1 | 1/2006 | Rodriguez et al. |
| 2006/0146791 | A1 | 7/2006 | Deb et al. |
| 2006/0224760 | A1 | 10/2006 | Yu et al. |
| 2007/0046686 | A1 | 3/2007 | Keller |
| 2007/0116027 | A1 | 5/2007 | Ciavaglia et al. |
| 2007/0274324 | A1 | 11/2007 | Wu et al. |
| 2008/0043676 | A1 | 2/2008 | Mousseau et al. |
| 2008/0049746 | A1 | 2/2008 | Morrill et al. |
| 2008/0123579 | A1 | 5/2008 | Kozat et al. |
| 2008/0259796 | A1 | 10/2008 | Abousleman et al. |
| 2008/0291834 | A1 | 11/2008 | Chou et al. |
| 2008/0320363 | A1 | 12/2008 | He |
| 2009/0003216 | A1 | 1/2009 | Radunovic et al. |
| 2009/0135717 | A1 | 5/2009 | Kamal et al. |
| 2009/0153576 | A1 | 6/2009 | Keller |
| 2009/0175320 | A1 | 7/2009 | Haustein et al. |
| 2009/0198829 | A1 | 8/2009 | Sengupta et al. |
| 2009/0207930 | A1 | 8/2009 | Sirkeci et al. |
| 2009/0238097 | A1 | 9/2009 | Le Bars et al. |
| 2009/0248898 | A1 | 10/2009 | Gkantsidis et al. |
| 2009/0285148 | A1 | 11/2009 | Luo et al. |
| 2009/0310582 | A1 | 12/2009 | Beser |
| 2009/0313459 | A1 | 12/2009 | Horvath |
| 2009/0316763 | A1 | 12/2009 | Erkip et al. |
| 2010/0014669 | A1 | 1/2010 | Jiang |
| 2010/0046371 | A1 | 2/2010 | Sundararajan et al. |
| 2010/0054164 | A1 | 3/2010 | Lucani et al. |
| 2010/0057636 | A1 | 3/2010 | Brennan et al. |
| 2010/0111165 | A1 | 5/2010 | Kim et al. |
| 2010/0146357 | A1 | 6/2010 | Larsson |
| 2011/0238855 | A1 | 9/2011 | Korsunsky et al. |
| 2011/0243324 | A1 | 10/2011 | Lima et al. |
| 2012/0218891 | A1 | 8/2012 | Sundararajan et al. |
| 2012/0300692 | A1 | 11/2012 | Star et al. |
| 2013/0077501 | A1 | 3/2013 | Krishnaswamy et al. |
| 2013/0107764 | A1 | 5/2013 | Zeger et al. |
| 2013/0114481 | A1 | 5/2013 | Kim et al. |
| 2013/0114611 | A1 | 5/2013 | Zeger et al. |
| 2013/0195106 | A1 * | 8/2013 | Calmon ............... H04L 69/14 370/389 |
| 2015/0256354 | A1 | 9/2015 | Zeger et al. |
| 2015/0372809 | A1 | 12/2015 | Lima et al. |
| 2016/0006676 | A1 | 1/2016 | Haeupler et al. |
| 2016/0154970 | A1 | 6/2016 | Calmon et al. |
| 2016/0157127 | A1 | 6/2016 | Zeger et al. |
| 2016/0302134 | A1 | 10/2016 | Kim et al. |

FOREIGN PATENT DOCUMENTS

| | | | |
|---|---|---|---|
| EP | | 3252978 A1 * | 12/2017 ............... H04L 1/06 |
| WO | WO 2007/109216 | A1 | 9/2007 |
| WO | WO 2010/005181 | A2 | 1/2010 |
| WO | WO 2010/005181 | A3 | 1/2010 |
| WO | WO 2010/025362 | A2 | 3/2010 |
| WO | WO 2010/025362 | A3 | 3/2010 |
| WO | WO 2011/043754 | A1 | 4/2011 |
| WO | WO 2011/119909 | A1 | 9/2011 |
| WO | WO 2012/167034 | A2 | 12/2012 |
| WO | WO 2013/006697 | A2 | 1/2013 |
| WO | WO 2013/067488 | A1 | 5/2013 |
| WO | WO 2013/116456 | A1 | 8/2013 |
| WO | WO 2014/159570 | A1 | 10/2014 |
| WO | WO 2014/160194 | A3 | 10/2014 |

OTHER PUBLICATIONS

"Guest Editorial Wireless Video Transmission;" IEEE Journal on Selected Areas in Communications; vol. 28; No. 3; Apr. 2010; pp. 297-298.

Abichar, et al.; "WiMax vs. LTE: Who Will Lead the Broadband Mobile Internet?;" Mobile Computing; IEEE Computer Society; IT Pro May/Jun. 2010; pp. 26-32.

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.

Acedanski, et al.; "How Good is Random Linear Coding Based Distributed Network Storage?;" Proc. 1st Workshop on Network Coding, Theory, and Applications (Netcod'05); Apr. 2005; 6 pages.

Adamson, et al.; "Multicast Negative-Acknowledgment (NACK) Building Blocks;" Internet Engineering Task Force (IETF),RFC; vol. 5401; Nov. 2008; 42 pages.

Adamson, et al.; "NACK-Oriented Reliable (NORM) Transport Protocol;" Internet Engineering Task Force (IETF); RFC; vol. 5740; Nov. 2009; 94 pages.

Adamson, et al.; "Quantitative Prediction of NACK-Oriented Reliable Multicast (NORM) Feedback;" Proceedings, MILCOM 2000; vol. 2; Oct. 2002; 6 pages.

(56) References Cited

OTHER PUBLICATIONS

Ahiswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit/Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House; Sep. 28-30, 2011; pp. 1358-1365.
Awerbuch, et al.; "On-Line Generalized Steiner Problem;" Proceedings of the $7^{th}$ Annual ACM—SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhadra, et al.; "Looking at Large Networks: Coding vs. Queuing;" Proc. of the 25th IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas In Communications; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computerand Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" PowerPoint Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; Isit; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al.; "Minimum Entropy Combinatorial Optimization Problems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No. 2.1; 2006, 10 pages.

Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.
Chou, et al.; "Practical Network Coding;" Proceedings of the $41^{st}$ Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@MIT—MIT Center for Wireless Networks and Mobile Computing; 2012 Inaugural Retreat; Oct. 10-11, 2012.
Cloud, et al.; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.
Deb, et al.; "On Random Network Coding Based Information Dissemination;" Proc. of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The 7th International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-489.

(56) References Cited

OTHER PUBLICATIONS

Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Sciences and Systems; 2006 40th Annual Conference on Mar. 22-24, 2006; 7 pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; 48th Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" 47th Annual Allerton Conference, IEEE; Sep. 30, 2009; pp. 447-454.
Feizi, et al.; "Cases Where Finding a Minimum Entropy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The 27th Conference on Computer Communications IEEE; Apr. 13-18, 2008; 5 pages.
Gheorghiu, et al.; "Multipath TCP with Network Coding for Wireless Mesh Networks;" IEEE Communications (ICC) 2010 International Conference; May 23-27, 2010; 5 pages.
Gheorghiu, et al.; "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; August 17-22; pp. 159-170.
Golrezaei, et al.; "FemtoCaching: Wireless Video Content Delivery Through Distributed Caching Helpers;" arXiv: 1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler; "Analyzing Network Coding Gossip Made East;" Proc. of the 43rd Symposium on Theory of Computing (STOC); Jan. 2011, 13 pages.
Haeupler, et al.; "Optimality of Network Coding in Packet Networks;" ArXiv, Feb. 17, 2011; 5 pages.
Haley, et al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Nework Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of 41st Annual Allerton Conference on Communications, Control and Computing; Oct. 2003; 10 pages.
Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.

(56) References Cited

OTHER PUBLICATIONS

Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; " PPR: Partial Packet Recovery for Wireless Networks;" SIGCOMM 07; Aug. 27-31, 2007; 12 pages.
Jamieson, et al.; " PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et al.; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE 27th Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in The Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The 43rd Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the 5th International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et al.; "Modeling Network Coded TCP Throughput: A Simple Model and its Validation", arXiv: 1008.0420v1 [cs.IT] Aug. 2, 2010; 9 pages.
Kim, et al.; "Modeling Network Coded TCP Throughput: A Simple Model and its Validation", Nov. 2010, Presentation; 19 pages.

Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding; "Distributed Computing Systems (ICDCS); 2011 31st International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the 42rd Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006-Spring); IEEE 63rd; vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?13 An Analysis of Practical Wireless Network Coding;" INFOCOM 2008; The 27th Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al.; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" 2nd International Congress on Image and Signal Processing, IEEE: Oct. 17, 2009; pp. 1-5.
Li, et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

(56) References Cited

OTHER PUBLICATIONS

Luby, et al.; "The Use of Forward Error Correction (FEC) in Reliable Multicast;" Internet Society Request for Comments; RFC 3453; Dec. 2002; 18 pages.

Lucani et al.; "On Coding for Delay New Approaches based on Network Coding in Network Coding in Networks with Large Latency;" Presentation in NetCod; Slide Presentation; Jun. 16, 2009; 17 pages.

Lucani et al.; "Broadcasting in Time-Division Duplexing: A Random Linear Network Coding Approach;" presented Switzerland; Conference: NetCod 2009, Lausanne, Switzerland; Jun. 2009; 6 pages.

Lucani et al.; "On Coding for Delay—New Approaches Based on Network Coding in Networks with Large Latency;" Conference: ITA Workshop, San Diego, USA; Feb. 2009; 10 pages.

Lucani et al.; "On Coding for Delay New Approaches based on Network Coding in Networks with Large Latency;" Conference ITA Workshop, San Diego, USA; Slide Presentation; Feb. 13, 2009; 11 pages.

Lucani et al.; "Random Linear Network Coding For Time Division Duplexing: Energy Analysis;" Conference: ICC 2009, Dresden, Germany; Jun. 2009; 5 pages.

Lucani et al.; "Random Linear Network Coding for Time-Division Duplexing: when to stop talking and start listening;" Presentation in ICC; Slide Presentation; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009; 10 pages.

Lucani et al.; "Random Linear Network Coding for Time-Division Duplexing: Queueing Analysis;" Conference ISIT 2009, Seoul, Korea; Jul. 2009; 5 pages.

Lucani et al.; "Random Linear Network Coding For Time-Division Duplexing: Field Size Considerations;" Conference: GLOBECOM 2009, Hawaii, USA; Dec. 2009; 6 pages.

Lucani, et al.; "Network Coding For Data Dissemination: It Is Not What You Know, But What Your Neighbors Don't Know;" Modeling and Optimization in Mobile, AdHoc, and Wireless Networks 2009; WiOPT 2009; 7th International Symposium on Jun. 23-27, 2009; pp. 1-8.

Lucani, et al.; "Network Coding Schemes for Underwater Networks;" WUWNet 07; Sep. 14, 2007; pp. 25-32.

Lucani, et al.; Systematic Network Coding for Time-Division Duplexing; Proceedings of the IEEE International Symposium on Information Theory (ISIT);; Jun. 13-18, 2010; pp. 2403-2407.

Lun, et al.; "Further Results on Coding for Reliable Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2006; pp. 1-6.

Lun; "Efficient Operation of Coded Packet Networks;" Ph.D. Dissertation; Massachusetts Institute of Technology; Jun. 2006; 130 pages.

Magli, et al.; "An Overview of Network Coding for Multimedia Streaming;" IEEE International Conference; Jun. 28, 2009; pp. 1488-1491.

Mallat, et al.; "Adaptive Covariance Estimation of Locally Stationary Processes;" Annals of Statistics, vol. 26, No. 1; 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the 44th Allerton Conference on Communication, Control, and Computing; Sep. 2006; 10 pages.

Medard, et al.; "On Coding for Non-Multicast Networks;" invited paper, 41st Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Moyer, et al.; "A Survey of Security Issues in Multicast Communications;" IEEE Network; vol. 13; No. 6; Nov./Dec. 1999; pp. 12-23.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al.; "Video Streaming with Network Coding;" Journal of Signal Processing Systems; vol. 59, Issue 3; DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

Oliveira, et al.; "A Network Coding Approach to Secret Key Distribution;" IEEE Transactions on Information Forensics and Security; vol. 3; No. 3; pp. 414-423; Sep. 2008.

Parandehgheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003; 14 pages.

Qureshi, et al.; "An Efficient Network Coding based Retransmission Algorithm for Wireless Multicast;" Personal, Indoorand Mobile Radio Communications, 2009 IEEE 20th International Symposium on Sep. 13-16, 2009; 5 pages.

Radunovic, et al.; "Horizon: Balancing TCP Over Multiple Paths in Wireless Mesh Network;" Proc. 14th ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at the 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogenous Links—A Method of Types Appoach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv: 1104.2941 v2 [cs.NI] Sep. 10, 2011; 6 pages.

Rezaee, et al.; "Speeding Multicast by Acknowledgment Reduction Technique (SMART) Enabling Robustness of QoE to the Number of

(56) References Cited

OTHER PUBLICATIONS

Users;" IEEE Journal on Selected Areas in Communication; vol. 30, No. 7; Aug. 2012; pp. 1270-1280.
Rezaee, et.al.; "Multi Packet Reception and Network Coding;" Military Communications Conference; 2010; MILCOM 2010; IEEE; Oct. 31, 2010-Nov. 3, 2010; pp. 1393-1398.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW08; IEEE; 2008; pp. 281-283.
Sanders, et al.; "Polynomial Time Algorithms for Network Information Flow;" 15th ACM Symposium on Parallel Algorithms and Architectures; Jun. 2003; pp. 1-9.
Sayenko, et al.; "Performance Analysis of the IEEE 802.16 ARQ Mechanism;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113;.
Shields; "The Interactions Between Ergodic Theory and Information Theory;" IEEE Transactions on Information Theory, vol. 44, No. 6; Oct. 1998; pp. 2079-2093.
Shrader, et al.; "Systematic wireless network coding;" Military Conference, 2009; MILCOM 2009; IEEE; 7 pages.
Shrader, et al.; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/ Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
Songpu, et al.; Performance analysis of joint chase combining and network coding in wireless broadcast retransmission; Wireless Communication, Network and Mobile Computing 2008; WiCOM '08, 4th International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. 43rd Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, Issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; 7th International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redundancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Valancius, et al.; "Greening the Internet with Nano Data Centers;" Proc. 5th International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3643.
Vien, al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interference in Ad Hoc Networks Using Joint Routing and Scheduling with Multiple Packet Reception;" in INFOCOM 2008; The 27th Conference on Computer Communications; IEEE; Apr. 2008; pp. 1517-1525.

(56) References Cited

OTHER PUBLICATIONS

Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieselthier, et al.; "Energy Efficient Broadcast and Multicast Trees in Wireless Networks;" Mobile Networks and Applications 7; Jan. 2002; pp. 481-492.
Wieseltheir, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995; pp. 412-422.
Yong, et al.; "XOR Retransmission in Multicast Error Recovery;" Networks 2000; ICON; Proceedings IEEE International Conference on Sep. 5-8, 2000; pp. 336-340.
Yun, et al.; "High-Throughput Random Access Using Successive Interference Cancellation in a Tree Algorithm;" IEEE Transactions on Information Theory; vol. 53; No. 12; Dec. 2007; pp. 4628-4639.
Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 the 28th International Conference on Distributing Computing Systems; Jan. 2008; 12 pages.
Zhang, et al.; Dual XOR In the Air: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
PCT International Preliminary Report on Patentability dated Nov. 26, 2020 for International Application No. PCT/US2019/032625; 10 pages.
U.S. Appl. No. 15/427,536, filed Feb. 8, 2017, Medard et al.
U.S. Appl. No. 15/358,776, filed Nov. 22, 2016, Calmon, et al.
PCT International Search Report and Written Opinion of the ISA for Appl. No. PCT/US2013/24039 dated Apr. 12, 2013.
PCT International Search Report of the ISA for PCT/US2009/055359 dated Mar. 30, 2011.
PCT Written Opinion of the ISA for PCT/US2009/055359 dated Mar. 30, 2011.
International Preliminary Report on Patentability of the ISA for PCT/US2009/055359 dated Apr. 12, 2011.
U.S. Pat. No. 8,279,781 issued on Oct. 2, 2012 (Lucani et al.); Part 1 of 3; 350 pages.
U.S. Pat. No. 8,279,781 issued on Oct. 2, 2012 (Lucani et al.); Part 2 of 3; 350 pages.
U.S. Pat. No. 8,279,781 issued on Oct. 2, 2012 (Lucani et al.); Part 3 of 3; 213 pages.
U.S. Pat. No. 8,451,756 issued on May 28, 2013 (Lucani et al.); Part 1 of 4; 400 pages.
U.S. Pat. No. 8,451,756 issued on May 28, 2013 (Lucani et al.); Part 2 of 4; 400 pages.
U.S. Pat. No. 8,451,756 issued on May 28, 2013 (Lucani et al.); Part 3 of 4; 400 pages.
U.S. Pat. No. 8,451,756 issued on May 28, 2013 (Lucani et al.); Part 4 of 4; 489 pages.
PCT International Preliminary Report on Patentability with Written Opinion for PCT/US2013/024039 dated Aug. 5, 2014 7 Pages.
European Extended Search Report dated Aug. 7, 2015 corresponding to European Application No. 13742964.3; 11 Pages.
Tomozei et al., "First Report on Novel Protocol Components with Network Coding;" Network Coding for Robust Architectures in Volatile Environments: Collaborate Project, No. 215252; Submitted Jan. 15, 2010; 78 Pages.
Zhuoqun et al., "An Improved MPTCP in Coded Wireless Mesh Networks;" Proceedings of the $2^{nd}$ IEEE International Conference on Broadband Network and Multimedia Technology; Oct. 18, 2009; 6 Pages.
Response (with Amended Claims) to European Office Action dated Apr. 8, 2016 corresponding to European Application No. 13742964.3; Response filed on Jun. 20, 2016; 12 Pages.
U.S. Non-Final Office Action dated Jun. 30, 2015 corresponding to U.S. Appl. No. 13/754,398; 29 Pages.
Response to U.S. Non-Final Office Action dated Jun. 30, 2015 corresponding to U.S. Appl. No. 13/754,398; Response filed Oct. 29, 2015; 13 Pages.
U.S. Final Office Action dated Feb. 16, 2016 corresponding to U.S. Appl. No. 13/754,398; 21 Pages.
Response to U.S. Final Office Action dated Feb. 16, 2016 corresponding to U.S. Appl. No. 13/754,398; Response filed on Aug. 12, 2016; 7 Pages.
Notice of Allowance dated Aug. 25, 2016 corresponding to U.S. Appl. No. 13/754,398; 8 Pages.
Response to Communication under Rule 71 (3) dated Aug. 8, 2017 from European Patent Application No. 13742964.3 as filed on Nov. 20, 2017; 6 Pages.
Communication Under Rule 71(3) EPC dated Dec. 14, 2017 from European Appl. No. 13742964.3; 66 Pages.
U.S. Non-Final Office Action dated Jul. 27, 2017 for U.S. Appl. No. 15/358,776; 55 pages.
Response to U.S. Non-Final Office Action dated Jul. 27, 2017 for U.S. Appl. No. 15/358,776; Response filed on Oct. 27, 2017; 18 pages.
Notice of Allowance dated Mar. 7, 2018 for U.S. Appl. No. 15/358,776; 21 pages.
PCT International Preliminary Report on Patentability dated Nov. 17, 2020 for International Application No. PCT/US2019/032625; 9 pages.
Kurant, "Exploiting the Path Propagation Time Differences in Multipath Transmission with FEC;" IEEE Journal on Selected Areas in Communications; Jun. 2011; 13 pages.
Gabriel, et al., "Multipath Communication with Finite Sliding Window Network Coding for Ultra-Reliability and Low Latency;" Downloaded from https://arxiv.org/abs/1802.00521; Feb. 2, 2018; 6 pages.

* cited by examiner

MULTIPATH CODING APPARATUS AND RELATED TECHNIQUES

CROSS REFERENCE TO RELATED APPLICATIONS

This patent application is a U.S. National Stage of PCT application number PCT/US2019/032625 filed in the English language on May 16, 2019, and entitled "MULTIPATH CODING FOR PACKET LATENCY REDUCTION," which claims the benefit of and priority to U.S. Provisional Patent Application No. 62/672,551, filed on May 16, 2018, which are herein incorporated by reference in their entireties.

BACKGROUND

As is known in the art, a network having a multipath network topology includes multiple paths between a source node (S) and a destination node (D). Such topologies have generally been used to achieve improvements in bandwidth, reliability, and average delay improvements.

As illustrated in FIG. 1, a network having a multipath topology includes a source node 100, a destination node 200 and a pair of signal paths 110, 120 between the source and destination nodes. When the source node is operating in accordance with a conventional multipath technique, the source node 100 concurrently transmits a first packet 112 along the first path 110 and a second packet 122 along the second path 120. Thus, two packets 112, 122 are transmitted substantially simultaneously through the two paths 110, 120 to the destination node. This is in contrast to non-multipath systems in which the source node transmits the two packets one at a time (i.e. sequentially) through a single path between the source and destination nodes.

The use of such a multipath approach provides improvements in bandwidth and a reduction in average delay (when there are no packet losses) as compared to non-multipath systems.

FIG. 2 illustrates a source node operating in accordance with a replicated multipath technique, in which packets 112, 114 are transmitted from the source node 100 to the destination node 200 over the first path 110 and a replicated set of packets 112', 114' are substantially simultaneously transmitted from the source node to the destination node 200 over the second path 120. By sending two sets of packets 112, 114, 112', 114' (with 112', 114' corresponding to a replicated set of the packets 112, 114) simultaneously over respective ones of paths 110, 120, communication in a replicated multipath system is not interrupted unless both paths are interrupted. Thus, with a replicated multipath technique, by sending all packets over multiple paths, reliability may be improved as compared with the reliability provided by operating in accordance with a conventional multipath technique (e.g. as illustrated in FIG. 1). In industrial networks having multipath topologies, replicated multipath techniques may be used for reducing individual packet latency as well as reliability. Replicated multipath is the basis of the IEEE 802.1CB Ethernet "frame replication and elimination" standard.

Table 1 illustrates possible timing (i.e. one possible arrival pattern) of two packets A and B transmitted by a source node and received at a destination node when two paths are used. In this illustration, packets are transmitted from the source node to the destination node simultaneously. As shown in the timing diagram of Table 1, path 2 introduces a delay of one time-slot compared to path 1. This results in an increased packet latency. Thus, the use of more than one path may allow the destination to complete earlier in time as compared to the use of only a single path (i.e. the use of both path 1 and path 2 allows a completion time at the destination node which is one time slot faster than would be achieved by using only path 2). The higher the variability between the paths, the higher the packet latency gain.

TABLE 1

| | Time | | | | |
|---|---|---|---|---|---|
| | $t_1$ | $t_2$ | $t_3$ | $t_4$ | $t_5$ |
| path 1 | A | | | B | |
| path 2 | | A | | | B |
| A received | ✓ | | | | |
| B received | | | | | ✓ |

As is also known, the use of coding can improve delay characteristics ever further. FIG. 3 illustrates a conventional coded multipath network. A coded multipath network avoids replication, thus using half the bandwidth of a replicated multipath network. However, since both paths in a coded multipath network are required to convey the information (paths 110, 120 in FIG. 3), reliability against path loss is not guaranteed. For example, in FIG. 3, if transmission of packet 322 (i.e. A-B) on path 120 (i.e. path 2) is interrupted, the destination (D) 200 may not receive full packets of A and B based only upon packet 312 (i.e. the packet which contains the sum A+B).

It is possible to also use replication in a source node operating in accordance with a coded multipath technique such that the source node operates in accordance with a replicated coded multipath technique. A replicated coded multipath technique provides protection against path loss. Such an approach, however, uses the full replicated bandwidth.

SUMMARY

In accordance with the concepts, systems, devices and techniques described herein described is are multipath coding systems, devices and methods which operate on or with coded and uncoded packets propagating over different network paths from a source to a node. The coded and uncoded packets are processed in accordance with a parametric redundancy multipath technique which is a hybrid scheme (combining aspects of replication schemes and coding schemes) that allows for the parametrization of redundancy in a network having a multipath topology. Use of a parametric redundancy multipath technique may reduce the number of transmissions required to transmit information between a source and a destination as compared with conventional techniques which maintaining redundancy.

While operating in accordance with a parametric redundancy multipath approach, devices and methods generate at least one of a plurality of uncoded packets for transmission on a first path from a source node to a destination node as well as at least one coded packet based upon a set of uncoded packets for transmission on a second path from the source node to the destination node. The set of uncoded packets are formed, generated or otherwise provided from a next uncoded packet to be transmitted, a number ($\alpha$) of previously transmitted uncoded packets, and a number ($\beta$) of uncoded packets that are to be transmitted after the next uncoded packet. Here a is an integer equal to or greater than zero, $\beta$ is an integer equal to or greater than zero, and $\alpha+\beta$ is greater than zero. The destination node operates to receive, and decode as needed, the uncoded and coded packets.

In accordance with one aspect of the concepts, systems, devices and techniques described herein, a multipath coding method running (or otherwise executing, operating, processing or functioning) in a source node (S) of a multipath network is disclosed. The method prepares or generates at least one of a plurality of uncoded packets for transmission on a first path (P1) from the source node (S) to a destination node (D). The method further generates a first coded packet based upon a set of uncoded packets for transmission on a second, different path (P2) from the source node (S) to the destination node (D). The set of uncoded packets comprises a next uncoded packet to be transmitted, α previously transmitted uncoded packets, and β uncoded packets that are to be transmitted after the next uncoded packet. Here, α is an integer equal to or greater than zero, β is an integer equal to or greater than zero, and the sum of alpha and beta (i.e. α+β) is greater than zero.

In one aspect the method further includes transmitting the at least one of a plurality of uncoded packets on the first path from the source (S) to the destination node (D) and transmitting the first coded packet on the second, different path (P2) from the source (S) to the destination node (D).

In one aspect of the concepts, systems, devices and techniques described herein, the destination node (D) retrieves information of at least one of the set of uncoded packets, by decoding the first coded packet, without receiving the at least one of the set of uncoded packets.

In one aspect of the concepts, systems, devices and techniques described herein, the multipath coding method further comprises generating a second coded packet and transmitting the second coded packet on a third, different path (P3).

In one aspect of the concepts, systems, devices and techniques described herein, the coded packets are evenly distributed to the second path (P2) and the third path (P3).

In one aspect of the concepts, systems, devices and techniques described herein, the coded packets are distributed to the second path (P2) and the third path (P3) according to network constraints associated with the second path and the third path.

In one aspect of the concepts, systems, devices and techniques described herein, the coded packets and the uncoded packets are distributed to the second path and the third path proportionally to the load of the second and third paths respectively.

In one aspect of the concepts, systems, devices and techniques described herein, α and β are fixed or variable.

In one aspect of the concepts, systems, devices and techniques described herein, one or more same uncoded packets are used for generating more than one coded packets. In another aspect of the claimed invention, systematic coding is used.

In one aspect of the concepts, systems, devices and techniques described herein, a may be determined according to the relative speedup of the second path.

In one aspect of the concepts, systems, devices and techniques described herein, β may be determined according to the relative slowdown of the second path.

In one aspect of the concepts, systems, devices and techniques described herein, network parameters for the source node include, but are not limited to: group of packets to be coded at any point in time, being defined by α and β; information rate; available paths; and allocated path loads.

In one aspect of the concepts, systems, devices and techniques described herein, the parameters for a source node are received from an external node.

In one aspect of the concepts, systems, devices and techniques described herein, the parameters for a source node are received from an external node corresponding to a network controller.

In one aspect of the concepts, systems, devices and techniques described herein, the parameters for a source node are determined at the source node according to externally-received information. In another aspect, the parameters for a source node are fixed or variable and can change dynamically.

In one aspect of the concepts, systems, devices and techniques described herein, wherein the externally-received information includes to one or more of: (a) channel/path state, (b) network state, (c) destination feedback, and (d) network feedback.

In an embodiment, in a multipath system at a destination node, a multipath coding method includes (a) receiving at least one of a plurality of original packets associated with a first path; (b) receiving at least one coded packets associated with a second path, the coded packets each being based upon α+β+1 uncoded packets scheduled for transmission on the first path, wherein α is an integer equal to or greater than zero, β is an integer equal to or greater than zero, and α+β is greater than zero; and (c) decoding the coded packets and retrieving information of uncoded packets based upon information in the coded packets.

In another embodiment, a machine implemented method for use at a source node (S) for transferring data to a destination node (D) includes: (a) obtaining, at the source node (S), a plurality of original data packets to be transferred to the destination node (D); (b) generating, at the source node, first coded packets by linearly combining two or more of the original data packets using network coding; (c) transmitting the plurality of original data packets along a first path (P1) leading from the source node (S) to the destination node (D); and (d) transmitting at least one of the first coded data packets along a second, different path (P2) leading from the source node (S) to the destination node (D), wherein the destination node (D) retrieves information in all of the plurality of original data packets, by decoding the at least one of the coded data packets, without requiring receiving all of the plurality of the original packets over the first path (P1).

In a different embodiment, a destination node apparatus and machine implemented method for use at a destination node for processing coded packets received from a source node via multiple different paths includes: (a) receiving at least one of a plurality of original packets associated with a first path; (b) receiving at least one coded packets associated with a second path, the coded packets each being based upon α+β+1 uncoded packets scheduled for transmission on the first path, wherein α is an integer equal to or greater than zero, β is an integer equal to or greater than zero, and α+β is greater than zero; c) for at least one coded packet associated with the second path that are successfully received, sending an acknowledgement message from the destination node to the source node; (d) forwarding all received original packets associated with the first path and all received coded packets associated with the second path to a common processing layer within the destination node without decoding the coded packets; (e) decoding the coded packets and retrieving information of uncoded packets based upon information in the coded packets; and (f) forwarding the original packets to a processing layer in the destination node. In embodiments, an acknowledgement message is sent from the destination node to the source node for a plurality of coded packets associated with the second path that are successfully received. In embodiments, an acknowledgement message is sent from the destination node to the source node for each of the coded packets associated with the second path that are successfully received.

BRIEF DESCRIPTION OF THE DRAWINGS

The foregoing features may be more fully understood from the following description of the drawings in which.

DETAILED DESCRIPTION

In accordance with the concepts described herein, it has been recognized that the use of coding in a network having a multipath topology can improve delay characteristics when the coded packet is designed so as to coincide with its associated uncoded packets.

Figure 2:
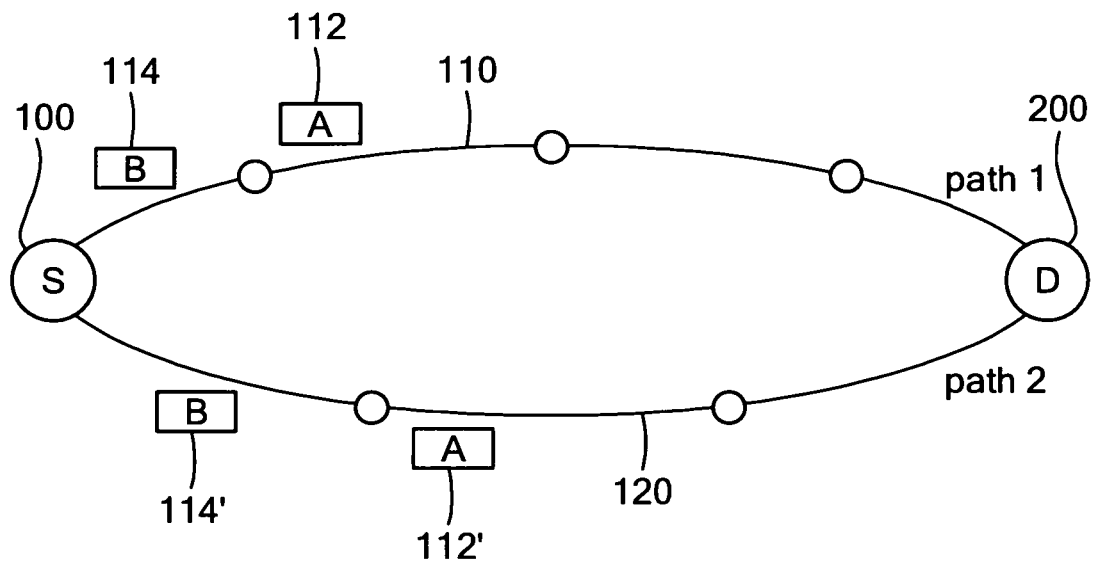
FIG. 2 is a schematic diagram of a network having a multipath topology and having a source node operating in accordance with a conventional replicated multipath technique.
Figure 4:
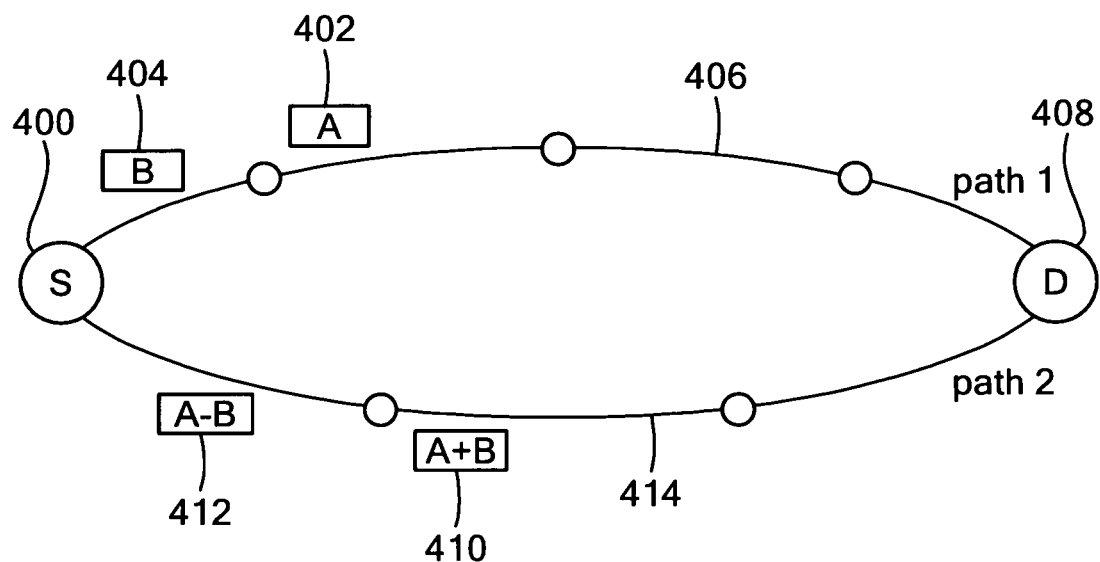
FIG. 4 is a schematic diagram of a network having a multipath topology and having a source node operating in accordance with a coded replicated multipath technique.

Referring now to FIG. 4, a network having a multipath topology (i.e. a so-called "multipath network") includes source node 400 which transmits a plurality of uncoded packets (here two uncoded packets 402, 404 being shown in the illustrative embodiment of FIG. 4) over a first path 406 to a destination node 408. Source node 400 also transmits a plurality of coded packets (here, two coded packets 410, 412 being shown in the illustrative embodiments of FIG. 4) over a second different path 414 to a destination node 408. Thus, source node 400 is operating in a accordance with a replicated coded multipath technique. Such operation provides protection against path loss. However, it uses the same bandwidth as a full replicated system (e.g. as shown in FIG. 2).

Figure 5:
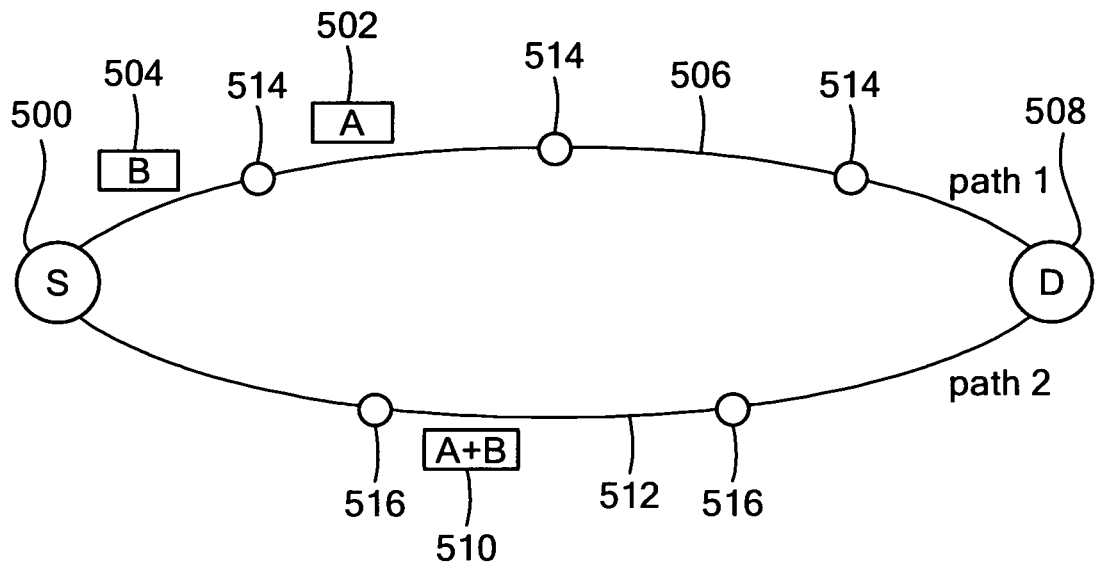
FIG. 5 is a schematic diagram of a network having a multipath topology and having a source node operating in accordance with a parametric redundancy multipath technique.

Referring now to FIG. 5, a multipath network includes source node 500 which transmits a plurality of uncoded packets (with two uncoded packets 502, 504 being shown in the illustrative embodiment of FIG. 5) over a first path 506 to a destination node 508. Source node 500 also transmits a coded packet (with a single coded packets 510 being shown in the illustrative embodiment of FIG. 5) over a second, different path 512 to the destination node 508. It should be appreciated that one or more intermediate nodes 514, 516 may exist in respective ones of the paths 506, 512 between the source and destination nodes 500, 508, respectively.

Source node 500 operates in accordance with a parametric redundancy multipath technique which is a hybrid scheme that allows for the parametrization of redundancy, where an information rate (R) (also sometimes referred to herein as a "code rate") is defined as the proportion of useful (i.e., non-redundant) data over the totality of the paths available. In other words, referring to FIG. 5, it is the ratio of an uncoded rate over both paths to a full data rate over both paths. The information rate (R) is therefore defined over the totality of paths available and can take any value between 0 and 1 (i.e. $0<R<=1$).

The information rate R can be calculated or otherwise determined as follows: for any native (i.e. uncoded) group of packets, the number of native packets divided by the total number of native and associated coded packets. In the illustrative embodiment of FIG. 5, there are two native packets (i.e. packets 502, 504) and one coded packet 510. Thus, the total number of native packets is two (2) while the total number of native packets and associated coded packets is three (3). Accordingly, in the illustrative embodiment of FIG. 5, the information rate R is 2/3.

It should be noted that in embodiments, the code rate R always satisfies $0<R<=1$ (and as noted above, R is defined here over the totality of paths available).

Moreover, a redundancy ratio may be denoted $1/R$. Thus, a full data rate may be determined as:

Full Data Rate=$(1/R)$×Uncoded Rate.

Table 2 compares the conventional, replicated, and parametric schemes given the same packet arrival pattern.

TABLE 2

Figure 3:
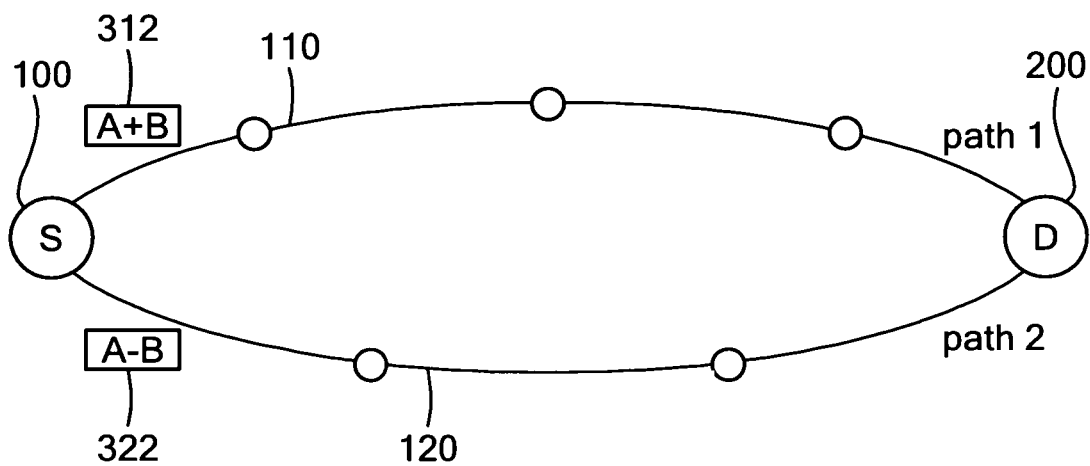
FIG. 3 is a schematic diagram of a network having a multipath topology and having a source node operating in accordance with a conventional coded multipath technique.

| | time | | | | |
|---|---|---|---|---|---|
| | $t_1$ | $t_2$ | $t_3$ | $t_4$ | $t_5$ |
| Replicated Multipath (FIG. 2) | | | | | |
| path 1 | A | | | B | |
| path 2 | | A | | | B |
| A received | ✓ | | | | |
| B received | | | | ✓ | |
| Conventional Coded Multipath (FIG. 3) | | | | | |
| path 1 | A + B | | | | |
| path 2 | | A − B | | | |
| A received | | ✓ | | | |
| B received | | ✓ | | | |
| Replicated Coded Multipath (FIG. 4) | | | | | |
| path 1 | A | | B | B | |
| path 2 | | A − B | | A − B | |
| A received | ✓ | | | | |
| B received | | ✓ | | | |
| Parametric Redundancy Multipath (FIG. 5) | | | | | |
| path 1 | A | | B | | |
| path 2 | | A + B | | | |
| A received | ✓ | | | | |
| B received | | ✓ | | | |

As can be seen from Table 2, coded schemes offer a potentially significant latency advantage, allowing decoding as soon as at the second time slot ($t_2$), in some instances. Note that the parametric redundancy multipath "scheme" (i.e. technique) uses three (3) transmissions as compared with the four (4) transmissions which would be required using a replicated scheme. In some embodiments, coding delays may affect transmission of packets 502, 504, 510. The coding delays depend upon a selected coding technology. The concepts, systems, devices and techniques sought to be protected herein are not dependent upon the selection of a particular coding technology.

Figure 6:
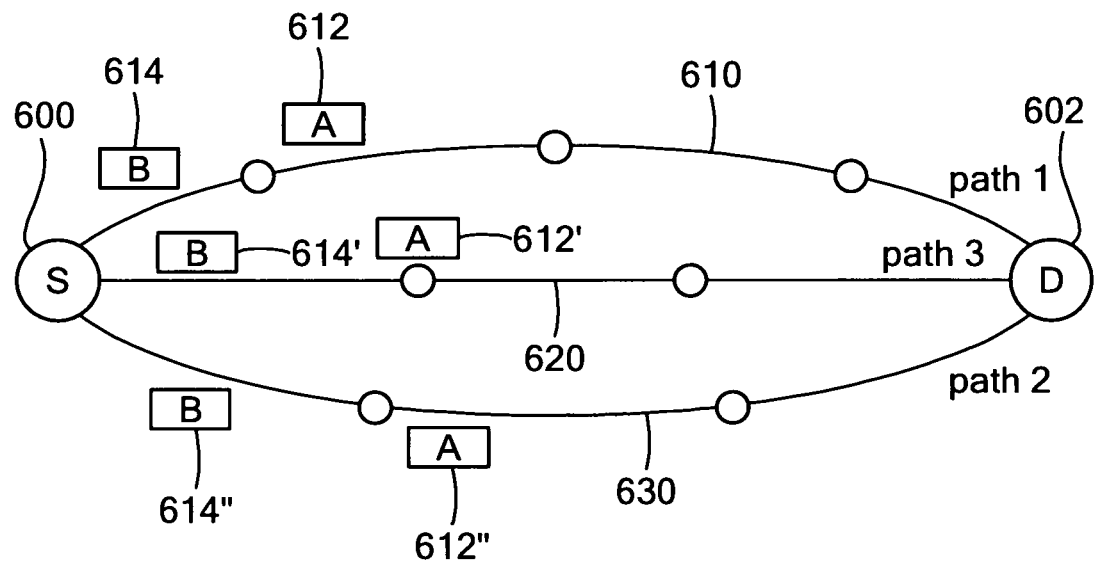
FIG. 6 is a schematic diagram of a network having a multipath topology and having a source node operating in accordance with a replicated multipath technique using a third path between a source node and a destination node.
Figure 7:
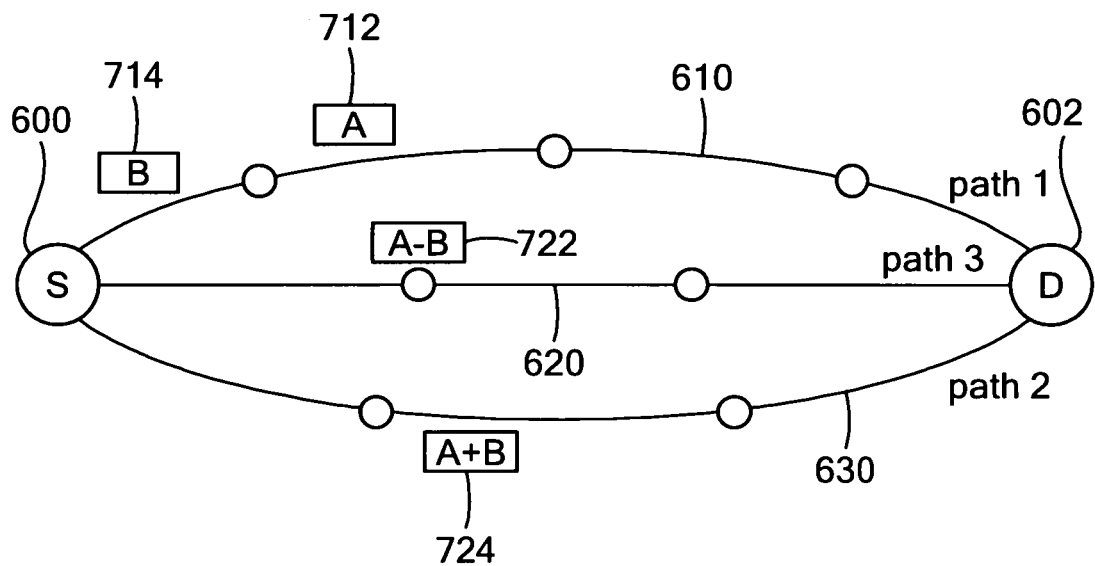
FIG. 7 is a schematic diagram of a network having a multipath topology and having a source node operating in accordance with a coded parametric redundancy network using a third path between a source node and a destination node.

Referring now to FIGS. 6 and 7, an example multipath network includes three signal paths 610, 620, 630 between a source node 600 and a destination node 602. In FIG. 6, source node 600 transmits a first set of packets A, B (denoted by reference numerals 612, 614) via path 610 to the destination node 602. Source node 600 also transmits a first set of replicated packets A, B (denoted by reference numerals 612', 614') via path 620 to the destination node 602 (i.e. packets 612', 614' are replications of packets 612, 614). Source node 600 also transmits a second replicated set of packets A, B (denoted by reference numerals 612'', 614'' to the destination node 602 via a path 630 (i.e. packets 612'', 614'' are also replicated versions of packets 612, 614). Thus, FIG. 6 illustrates operation using the replicated technique with R=1/3.

Figure 1:
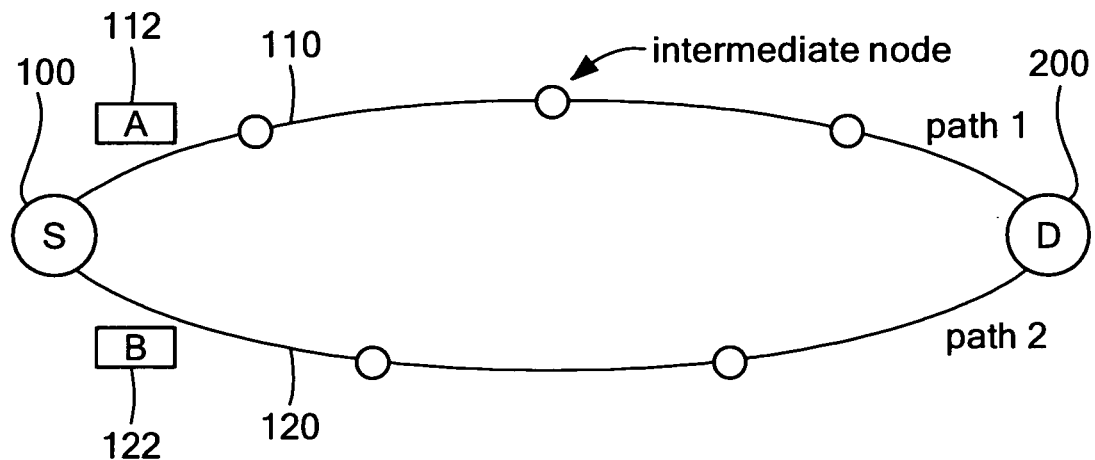
FIG. 1 is a schematic diagram of a conventional multipath topology having multiple paths from one source (S) to one destination (D)

In FIG. 7, source node 600 operates to transmit a first set of packets A, B (denoted by reference numerals 712, 714) via path 610 to the destination node 602. (which may be the same as or similar to source node 600 described above in FIG. 6). Packets 712, 714 may be the same as or similar to packets 612, 614 in FIG. 1. Source node 600 also operates to transmit at least one coded packet A−B 722 via path 620 to the destination node 602 (i.e. packet 722 is a coded version of packets 712, 714). Source node 600 also operates to transmit a second coded packet A+B (denoted by reference numerals 724) to the destination node 602 via a path 630 (i.e. packets 722, 724 are coded versions of packets 712, 714). Thus, FIG. 7 illustrates operation using a coded parametric technique with R=1/2.

As noted above, the information rate, or code rate, R is defined for any native group of packets as the number of native packets divided by the total number of native and associated coded packets. As also noted above, the code rate R is within the range of $0 < R <= 1$.

Table 3 compares packet latency gains in replicated and parametric schemes for a given arrival pattern.

TABLE 3

| | time | | | | |
|---|---|---|---|---|---|
| | $t_1$ | $t_2$ | $t_3$ | $t_4$ | $t_5$ |
| Replicated Multipath (FIG. 6) | | | | | |
| path 1 | A | | | B | |
| path 2 | | A | | | B |
| path 3 | A | | | B | |
| A received | ✓ | | | | |
| B received | | | | ✓ | |
| Parametric Redundancy Multipath (FIG. 7) | | | | | |
| path 1 | A | | | B | |
| path 2 | | A + B | | | |
| path 3 | A − B | | | | |
| A received | ✓ | | | | |
| B received | ✓ | | | | |

The timing diagram of Table 3 compares packet latency gains in replicated and parametric schemes for a given arrival pattern. In this case, packet A (denoted by reference numeral 612 in FIG. 6 and by reference numeral 712 in FIG. 7) is received and packet B 614 (FIG. 6), 714 (FIG. 7) is decoded on the first time slot ($t_1$) in the coded scheme, compared to the fourth ($t_4$) in the uncoded scheme. When more paths are available, the coded scheme can avoid that packets arrive out-of-order without complex packet scheduling, thus improving packet latency. This illustrates increased latency improvements given path delay variability.

It should be noted that the parametric scheme has a higher information rate and while using fewer transmissions (less bandwidth) than a replicated multipath system. In addition, latency, bandwidth (and energy) improvements depend on the coding technology and parameters used.

Benefits of the above-explained technique may be emphasized when considering a scenario for transmitting more packets, for example 3 packets.

Figure 8:
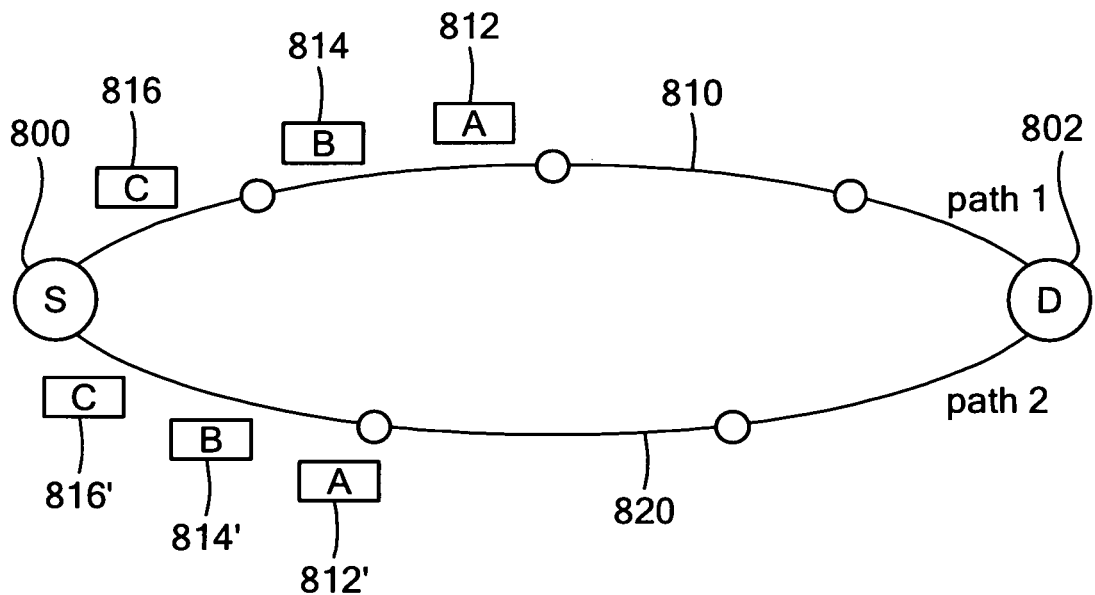
FIG. 8 is a schematic diagram of a network having a multipath topology and having a source node operating in accordance with a replicated multipath technique for sending three (3) packets over a plurality of signal paths.

Referring now FIG. 8, illustrated is a multipath network in which a source node operates in accordance with a conventional replicated multipath technique. As noted hereinabove, a conventional replicated multipath technique focuses on reliability or bandwidth usage.

Figure 9:
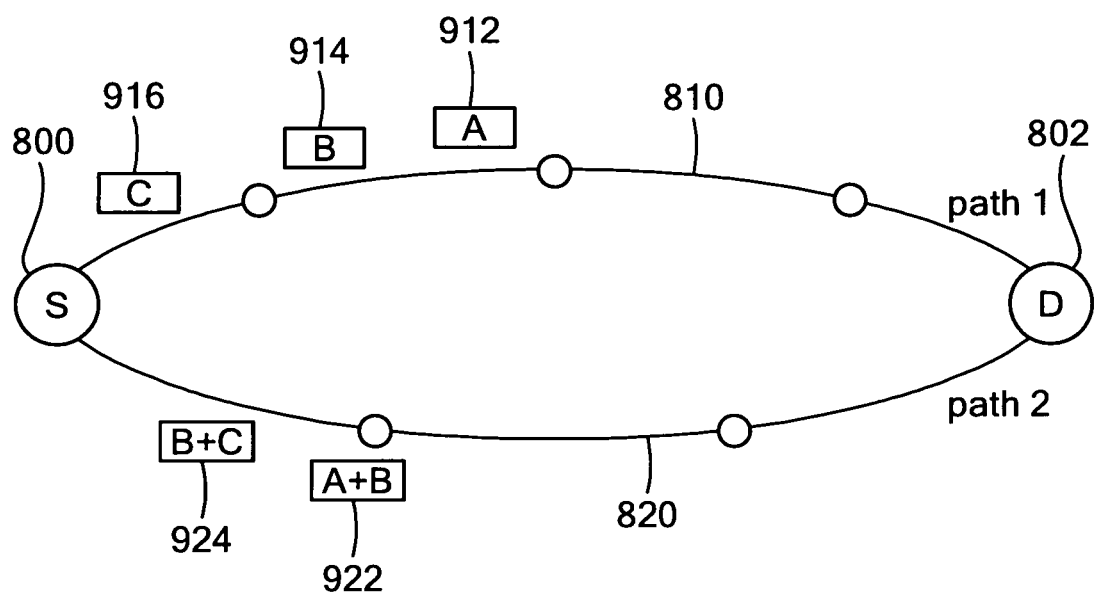
FIG. 9 is a schematic diagram of a network having a multipath topology and having a source node operating in accordance with a coded parametric redundancy multipath technique for sending three (3) packets over a plurality of signal paths.

The example multipath network of FIGS. 8 and 9 in which like elements are provided having like reference designations, includes a pair of signal paths 810, 820 between a source node 800 and a destination node 802. In FIG. 8, source node 800 transmits three packets A, B, C (denoted by reference numerals 812, 814, 816) via path 810 to the destination node 802. Source node 800 also transmits three replicated packets A, B, C (denoted by reference numerals 812', 814', 816') via path 820 to the destination node 802 (i.e. packets 812', 814', 816' are replications of packets 812, 814, 816). Thus, FIG. 6 illustrates operation using a replication technique.

Referring to timing TABLE 4 of the system described in FIG. 8, it is shown that packets A, B, C must be received by a destination node. Here, the destination node receives all packets A, B, C at $t_6$.

TABLE 4

| | time | | | | | | | |
|---|---|---|---|---|---|---|---|---|
| | $t_1$ | $t_2$ | $t_3$ | $t_4$ | $t_5$ | $t_5$ | $t_6$ | $t_7$ |
| Replicated Multipath (FIG. 8) | | | | | | | | |
| path 1 | A | | | | B | | | C |
| path 2 | | A | | | | B | | C |
| A received | ✓ | | | | | | | |
| B received | | | | | ✓ | | | |
| C received | | | | | | | ✓ | |
| Coded Multipath - Coding for Latency (FIG. 9) | | | | | | | | |
| path 1 | A | | | | B | | | C |
| path 2 | | A + B | | | B + C | | | |
| A received | ✓ | | | | | | | |
| B received | | ✓ | | | | | | |
| C received | | | | | | | ✓ | |

In another embodiment, a different coding to reduce packet latency may be used. Table 4 shows a coding configuration that allows for the decoding and delivery of packets earlier in time than is achieved using a replicated multipath scheme as shown in FIG. 8.

In FIG. 9, source node 800 operates to transmit a first set of packets A, B, C (denoted by reference numerals 912, 914, 916) via path 810 to the destination node 802. Packets 912, 914,916 may be the same as or similar to packets 812, 814, 816 in FIG. 8. Source node 800 also operates to transmit at least a pair of coded packet A+B 922 and B+C 924 via path 820 to the destination node 802 (i.e. packets 922, 924 are coded versions of packets 912, 914, 916). Thus, FIG. 9 illustrates operation using a coded parametric technique.

The coded parametric multipath scheme of FIG. 9 delivers all packets earlier that the uncoded replication scheme illustrated in FIG. 8. One possible implementation of the coded parametric multipath scheme is to have the source node, at each transmission opportunity, combine the last transmitted outgoing packet on a first path (e.g. path 1) with the β packets scheduled for transmission, where β is a fixed positive natural number or is variable and depends upon network conditions (including, but not limited to, the latest delay characteristics of the paths, or the latest delay difference between them).

The value of β may depend upon a variety of factors including, but not limited to, relative path delays. For example, if it is known to the source that path 1 is T time units faster than path 2, the source could combine one packet more than the number of packets expected to be received in a period of time T in order to enable a decoding event at the destination node.

The second scenario of TABLE 5 shows a new arrival pattern that shows coded multipath using consecutive uncoded packets (A+B at time $t_2$) followed by B+C at time $t_3$ to decode more than one yet unreceived uncoded packet (B at $t_4$ and C at $t_6$). This illustrates the impact of path variability on decoding events, thus on packet latencies.

TABLE 5

| | time | | | | | | | |
|---|---|---|---|---|---|---|---|---|
| | $t_1$ | $t_2$ | $t_3$ | $t_4$ | $t_5$ | $t_5$ | $t_6$ | $t_7$ |
| Replicated Multipath (FIG. 8) | | | | | | | | |
| path 1 | A | | | | B | | | C |
| path 2 | | A | | B | | | | C |
| A received | ✓ | | | | | | | |
| B received | | | ✓ | | | | | |
| C received | | | | | | | | ✓ |
| Coded Multipath - Coding for Latency (FIG. 9) | | | | | | | | |
| path 1 | A | | | | B | | | C |
| path 2 | | A + B | B + C | | | | | |
| A received | ✓ | | | | | | | |
| B received | | ✓ | | | | | | |
| C received | | | ✓ | | | | | |

As illustrated in FIG. 9, a destination may receive packet A uncoded while decoding packet B upon receiving the first coded packet. This coded parametric multipath technique is thus superior to the conventional coding technique described above in conjunction with FIG. 3. Furthermore, using the coded parametric multipath concepts and techniques described herein, coding can be designed to insure that decoding occurs as soon as possible for each packet. The benefit is clearly shown in the timing tables in TABLE 4 and TABLE 5.

In TABLE 5, using a parametric redundancy multipath technique, the destination node may receive or decode A at time $t_1$, B at time $t_2$, and C at time $t_3$. Accordingly, the coded scheme delivers all packets earlier that the uncoded replication scheme.

It should be appreciated that the technique described in FIG. 9 and TABLE 4 is for reducing latency. If reliability is more important than less latency, a redundancy ratio (1/R) may be adjusted. Thus, in this case, the source node may send more coded packets to the destination. For example, rather than sending only coded packets B+C and A+B (as illustrated in FIG. 9) the source may send coded packets A+B, B+C, A−B, and B−C to increase reliability for the transmission.

It should be appreciated that when more paths are available, the coded scheme can avoid that packets arrive out-of-order without complex packet scheduling, thus improving packet latency. This illustrates increased latency improvements given path delay variability. It should be also noted that the parametric scheme has a higher code rate R and uses less transmissions.

In accordance with an aspect of the concepts described herein, one or more source nodes may need to distribute packets across multiple available paths. Such source nodes S may operate in accordance with a variety of different schemes depending upon a load in response to various load conditions. Such operating schemes include but are not limited to an equal load scheme and a load-based scheme.

During equal load operation, for each group of native packets and information rate, a source node: (1) computes redundant packets; and (2) sends native and coded packets across all available paths with equal loads, where each path sees an equal number of packets. The equal-load operation will be described in detail below when referring FIGS. 10A-10B.

During load-based operation, for each group of native packets and information rate, a source node: (1) computes redundant packets from native group of packets; (2) receives or determines path loads; and (3) sends native and redundant packets across all available paths according to computed path loads. The load-based operation will be described in detail below when referring FIGS. 10A-10B.

In embodiments, to receive or determine path loads, a source node receives or determines the total load T of the P paths (information units/second, e.g., bits/second) as well as partial path loads $H_i$, where i is a path index (i=1 . . . P) and P is the number of paths.

In embodiments, to send native and redundant packets across all available paths according to computed path loads, for each group of coded and native packets of size G, the number $G_i$ of packets to send via path i (i=1 . . . P) should satisfy $G_i/G=H_i/T$).

In either of the above techniques (i.e. either of the equal load or load-based techniques), the group of packets can be a block or window of fixed or variable size. Similarly, the information rate and path information can be fixed or variable. Also, packet groups may overlap. That is, one uncoded packet may be used for generating more than one coded packets.

It should be noted that in the above, systematic coding is assumed. However, it should be appreciated that in embodiments packets can all be coded prior to transmission at a source.

It should also be appreciated that since larger packet groups take more time to transport and get decoded at a destination, a packet group size G can be reduced to achieve a specific required latency.

It should also be appreciated that the parameters for a source node can be received from an external node (e.g., a network controller or other device) or may be otherwise be determined or provided in any manner such as through the use of any local or external mechanism. Such local or external mechanisms may include, but are not limited to fixed, channel state, network state, destination feedback, network feedback, etc.).

In embodiments, system parameters and design may be selected in the following manner.

Source Node Processing

In some embodiments, a technique for generating coded packets may increase the likelihood that the coded packets lead to a decoding event that may reduce latency. Here, source nodes need to distribute packets across the multiple available paths so that decoding is possible sooner. One path is used for native/original packets, the other available paths are used for coded packets, typically at a lower rate. Each transmitted coded packet should lead to a decoding event, as decoding generates "new packets" for the destination, thus reducing packet latency.

The source transmits packets on the main (uncoded) path in order, following a predetermined schedule (e.g., order of arrival). Let each packet have an index, where the index shows the scheduled order of transmission.

For each transmission opportunity on the coded paths:
Denote the next packet to be transmitted on the uncoded path $p_n$, where n is the packet index.
Create and transmit a coded packet combining α packets among the latest packets that were transmitted (preceding packets) and β packets among the packets that are to be transmitted (succeeding packets).

Here, any coding scheme can be used to generate the coded packet. For example, using linear coding, the coded packet could be the result of the summation: $\Sigma_{i=0}^{\alpha+\beta} c_i p_{n-\alpha+i}$, where $c_i$ is a coding coefficient, and operations are carried out symbol-wise, in a predefined finite field or any predefined subset thereof. The generated coding coefficients may be appended to the coded packet for transmission to the destination node.

α may be determined through knowledge of the relative speedup of the coded path (i.e., it may be related to the number of packets that the coded packet will have "overtaken" when received at the destination node). In this case, the earliest time the coded packet arrives at the destination should coincide with the arrival of packet $p_{n-a}$. Similarly, β may be determined through knowledge of the relative slowdown of the coded path (i.e., it may be related to the number of packets that will "overtake" the coded packet when the coded packet is received at the destination node). In this case, the latest time the coded packet arrives at the destination should coincide with the arrival of packet $p_{n+b}$. In some embodiments, α and β may be fixed or variable. $\alpha>=0$, $\beta>=0$ may be fixed or variable. Their values may be determined by the source, the destination, or a network controller, from any information they may have (such as packet arrivals feedback, channel state information, etc.) and conveyed to the source. For example, FIG. 9 and Table 4, illustrate a case where $\alpha=\beta=1$.

The transmission opportunity on the coded path may be dictated or affected by various factors such as load constraints, congestion constraints, medium access control protocol, a target information rate, etc.

The information rate R can be adjusted to compensate for packet losses on the main path, or to replace path losses.

Systematic coding is assumed above. However, some packets on the main path may be coded to protect against packet losses on the main path. In that case, packets on the coded (secondary) path may use the coded paths scheduled for transmission on the main path or skip them. If coded packets are used as source packets, then the coded packets generated for the secondary (coded) path may be recoded.

The parameters for the source node (group of packets to be transmitted at any point in time, information rate, available paths, allocated path loads) can be received from an external node (e.g., network controller) or determined through any local or external mechanism (e.g., fixed, channel state, network state, destination feedback, network feedback, etc.).

Figure 11:
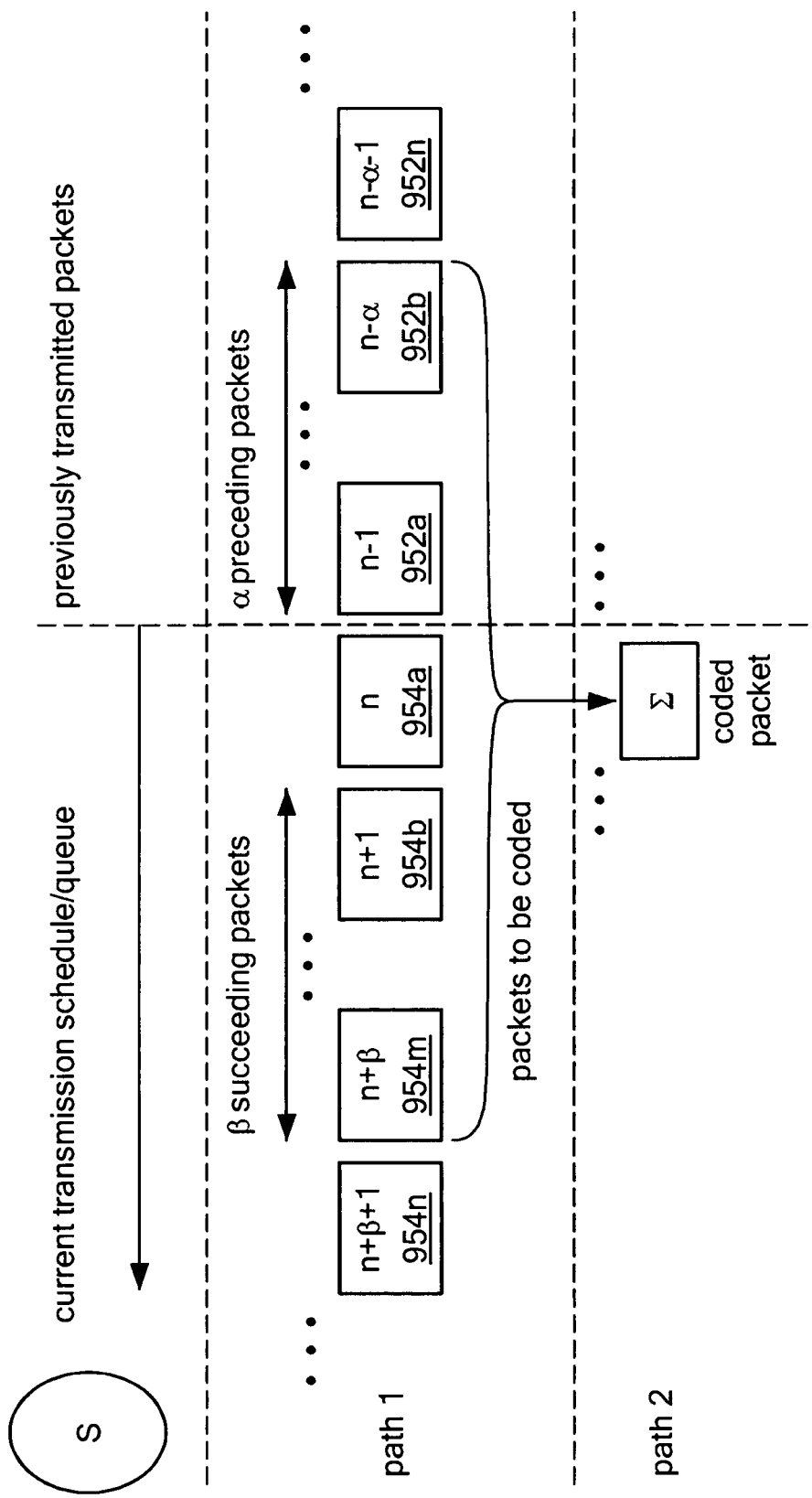
FIG. 11 is a schematic diagram of encoding coded packets at a source node in accordance with a coded parametric redundancy multipath technique.

Referring now FIG. 11, the diagram shows scheduling packet transmission and coding at the source node. This technique may use a number of transmitted uncoded packets 952a, 952b, . . . 952n and β number of untransmitted uncoded packets 954a, 954b, 9, . . . 954m, 954n. For example, FIG. 9/Table 4 show a case where $\alpha=1$, $\beta=0$ (take one preceding packet and no succeeding packet).

The above-mentioned technique assumes that the source node buffers a or more packets after transmission and has access to β or more packets to be transmitted. In this case, regarding the preceding packets, the buffering requirement may be enforced at the source, or the source can code as may packets as available, up to α. On other hand, regarding the succeeding packets, the source node may code as many packets as available, up to β. The source may also request up to β packets from the packet generating process (e.g., application layer, content cache/server application, etc.).

Flowcharts

Figure 10:
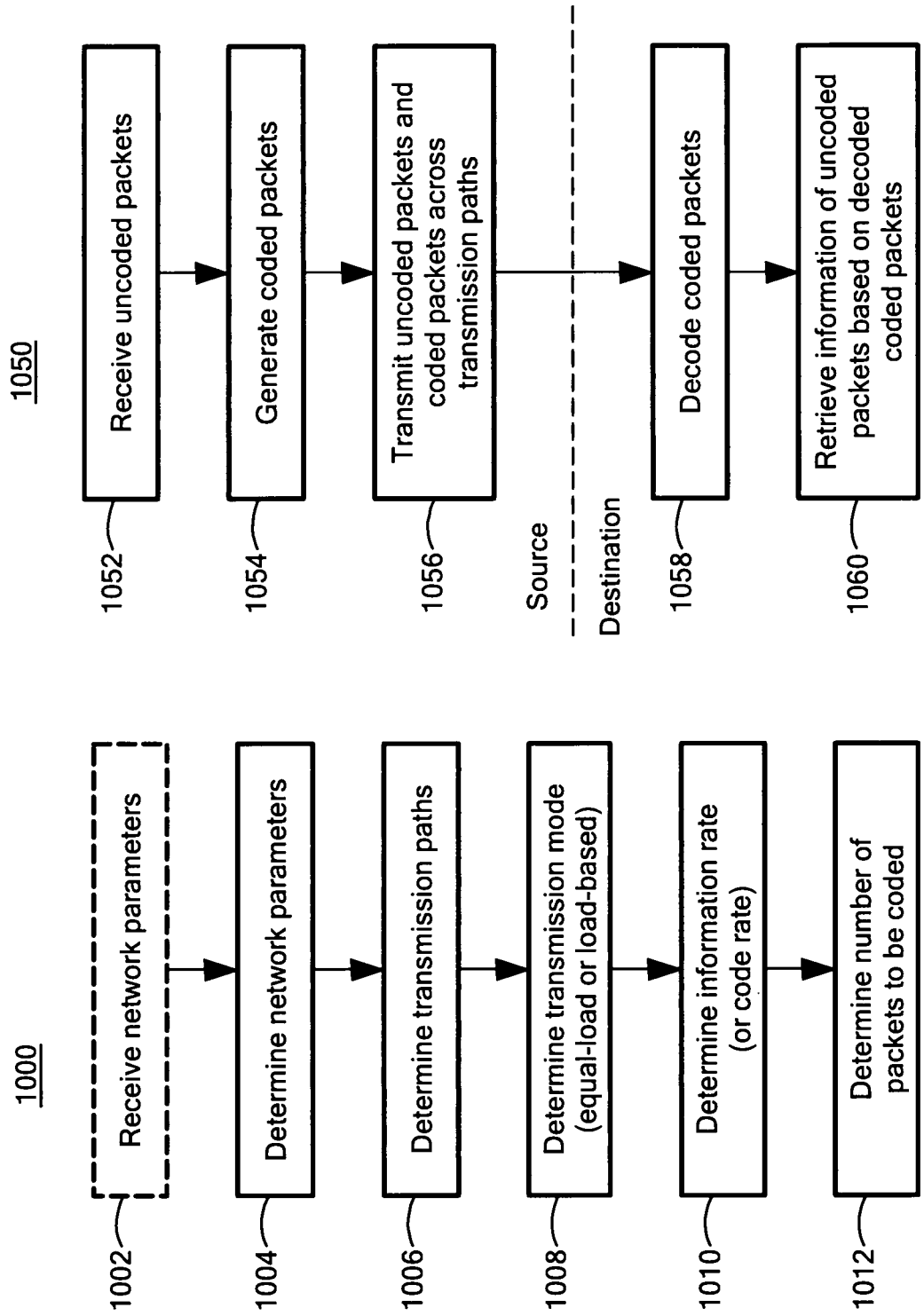
FIG. 10A is a flow diagram illustrating an example of preparing network parameters for transmission of packets over a plurality of signal paths between a source node and a destination node in accordance with a coded parametric redundancy multipath technique.
FIG. 10B is a flow diagram illustrating an example of transmitting packets over a plurality of signal paths between a source node and a destination node in accordance with a coded parametric redundancy multipath technique.

FIGS. 10A and 10B are a series of flow diagrams which illustrate processing that can be implemented within devices or systems of a computing system. Rectangular elements (typified by element 1002 in FIG. 10A), herein denoted "processing blocks," represent computer software instructions or groups of instructions. Diamond shaped elements (not shown), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information of one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, systems, devices, and techniques sought to be protected herein. Thus, unless otherwise stated, the blocks described below are unordered meaning that, when possible, the functions represented by the blocks can be performed in any convenient or desirable order.

Referring to FIG. 10A, an example of a process to prepare parameters for transmission is 1000. Process 1000 may prepare parameters to be used for coded multipath transmission.

In some embodiments, network parameters may be received (in processing block 1002) from an external node or external system (e.g., network controller, network management system). The parameters may include packet group size, information rate (or code rate), available paths, and allocated path loads. The external node or external system may provide additional information about the network, such as channel state, network state, destination feedback, network feedback, and others. In other embodiments, the information about the network may be stored internally. One or more parameters may be used by any node (e.g. one or more of a source node, an intermediate node, and/or a destination node) and such parameters include, but are not limited to: group of packets to be transmitted at any point in time, being defined by $\alpha$ and $\beta$; information rate; available paths; and allocated path loads.

According to the information about the network, network parameters may be determined (in processing block 1004). When an external node or external system provide network parameters, additional network parameters may be calculated or determined according to the provided network parameters. For example, according to provided information about available paths and allocated path loads, a code rate may be calculated or determined.

In processing block 1006, process 1000 determines transmission paths. In some embodiments, all available paths may be determined to be used for packet transmission. In another embodiment, a subset of the available paths may be selected for packet transmission. In processing block 1008, process 1000 determines transmission mode. Packets may be transmitted across transmission paths evenly or according to path load. Process 1000 may consider available paths, allocated path loads, number of packets to transmit, and/or information rate to determine the transmission mode. For example, if allocated path loads are even or close to even, equal-load mode may be selected as a transmission mode.

In processing block 1010, process 1000 determines an information rate (or code rate). The information rate, or code rate, R may be defined for any native group of packets as the number of native packets divided by the total number of native and associated coded packets. The information rate R is greater than zero and may be equal to 1 or less than 1. A desired latency, network paths reliability, bandwidths, and other parameters may be considered to determine the information rate. In some embodiments, the information rate may be given by an external node or system (in processing block 1002). In other embodiments, process 1000 may revise the information rate provided by the external node or system according to other network parameters.

In processing block 1002, process 1000 determines packets to be coded. Encoding to generate to a coded packet is based upon a set of uncoded packets. The set of uncoded packets comprise a next uncoded packet to be transmitted, $\alpha$ previously transmitted uncoded packets, and $\beta$ uncoded packets that are to be transmitted after the next uncoded packet. Here a is an integer equal to or greater than zero, $\beta$ is an integer equal to or greater than zero, and $\alpha+\beta$ is greater than zero. The value of a and 0 are decided according to network bandwidths, CPU power of the destination, or any other factors.

Referring to FIG. 10B, process 1050 illustrates an example of packet transmission with an equal-load transmission mode. A source node may receive native packets to transmit from an external node (in processing block 1052). In processing block 1054, coded packets are generated from the native packets. Various techniques may be selected and used to encoding native packets. For example, linear combination with coefficient may be used. In some embodiments, packets may be all coded before transmission. In other embodiments, a portion of native packets may be coded when transmission starts, and remaining packets may be coded as transmission continues.

Under equal-load transmission load, uncoded packets and coded packets are transmitted evenly across transmission paths, which are selected according to network parameters in processing block 1006 of FIG. 10A. The uncoded packets and coded packets may be distributed across the transmission paths according to network constraints, such as available load of the coded paths, medium access control transmission opportunities, path congestion, and any other factors. In an embodiment, native packets and coded packets may be transmitted sequentially across the transmission paths in a circular way. For example, when transmission paths P1, P2, P3 are used for transmission, process 1050 may transmit packets in the order of P1→P2→P3→P1→ . . . . In another embodiment, packets may be transmitted in the order of P1→P2→P3→P3→P2→P1 . . . . In other embodiment, a suitable method for distributing packets evenly across transmission paths may be used.

In processing block 1058, when coded packets are received at a destination, the coded packets are decoded according to a coding technique used to encode native packets in processing block 1054. A destination node may get native packets from decoding coded packets. For example, the destination node may get native packets A and B by decoding a coded packet A+B.

In processing block 1060, the destination retrieves information of uncoded packets by using information from coded packets which are received and decoded. For example, using the example illustrated in FIG. 7, when the destination 200 gets native packet B 714 through P1 110, and gets coded packet A-B 722 through P2 120, the destination 200 may determine that it received all packets A, B since the destination 200 can get packet A by decoding A-B.

Figure 12:
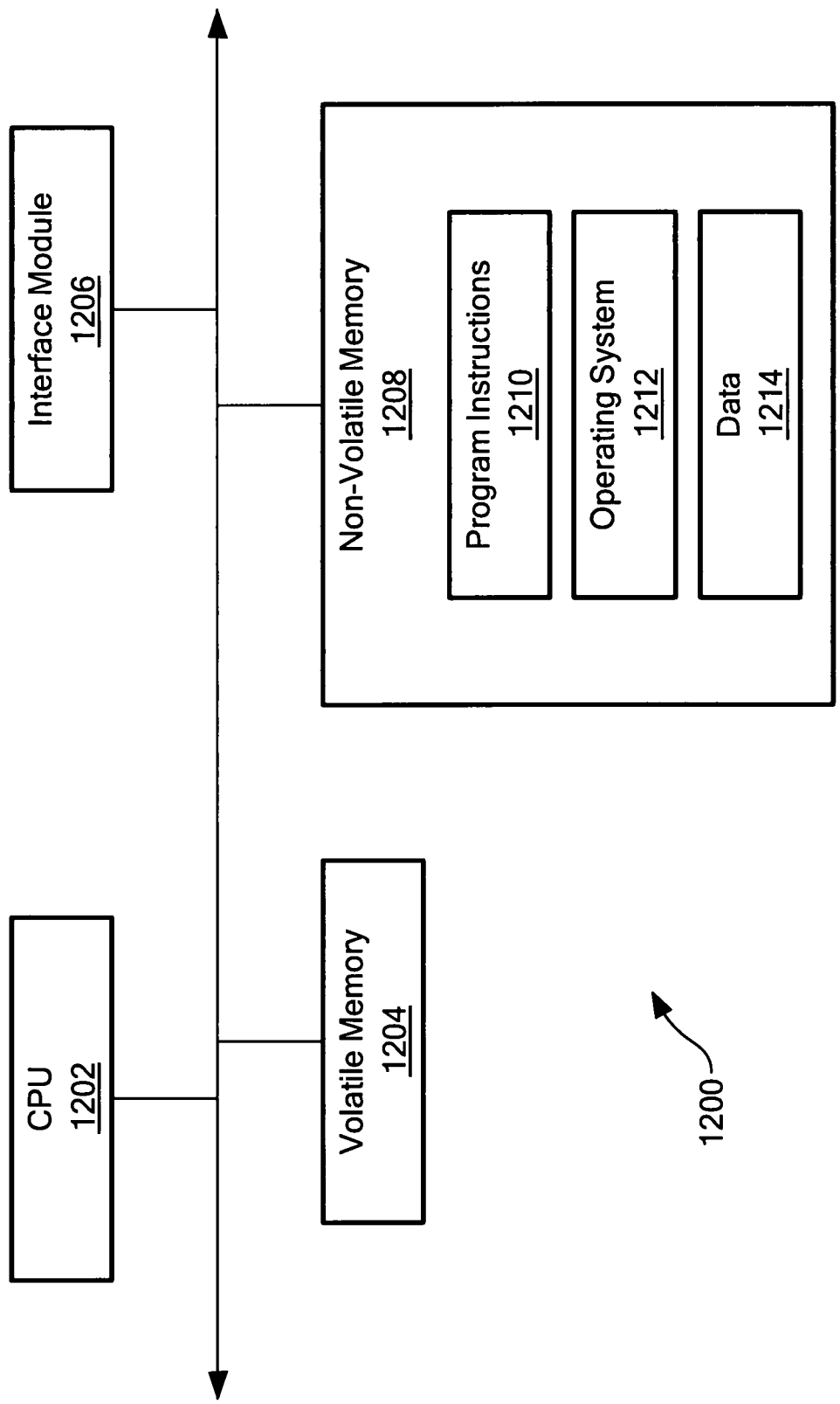
FIG. 12 is an illustrative implementation of a network system or network node capable of performing the processes described to implement a coded parametric redundancy multipath technique.

Referring now to FIG. 12, an illustrative implementation of a network system 1200 which may be suitable to implement the processing techniques described herein includes a processor 1202, a volatile memory 1204, a non-volatile memory 1208 (e.g., hard disk, flash memory) and the interface module 1206 (e.g., a user interface, USB interface and so forth). The non-volatile memory 1208 stores program instructions 1210, an operating system 1212 and data 1214. In one example, the program instructions 1212 are executed by the processor 1202 out of volatile memory 1204 to perform all or part of the processes described herein (e.g., processes 1000).

The processes described herein (e.g., process 1000) is not limited to use with hardware and software of FIG. 12; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural, functional, or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

One concept sought to be protected in this application is the creation and use of coded packets that enable lower individual packet delivery delays (i.e., likely to enable decoding events at the destination, thus releasing a new packet). In some embodiments, feedback can be helpful, but it may not be available. Without feedback or knowledge of path delays at the source node, the source node may simply code the next N>=2 packets to be transmitted when there is a transmission opportunity (for example, N=2 in FIG. 9). With knowledge of path delays (or delay differences), the source node may estimate packet arrivals at the destination and create a coded packet that is likely to enable decoding. Herein, feedback may be helpful to estimate path delays.

Furthermore, the parametric coded multipath system disclosed herein application enables consideration of redundancy (and ideally, total redundancy) and the number of paths and determination of network parameters that enables latency gains while also improving reliability (i.e., successfully transmitting packets even with path loss).

In the foregoing detailed description, various features of the concepts, systems, devices and techniques may be grouped in one or more individual embodiments simply for the purposed of streamlining the disclosure. This method of disclosure is not to be interpreted as reflecting an intention that the claimed subject matter requires more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

All publications and references cited herein are expressly incorporated herein by reference in their entirety.

What is claimed is:

1. A source node arranged to communicate with one or more destination nodes across a network, the network having a plurality of paths between the source node and the one or more destination nodes, the source node comprising:
  a processor and a memory configured to:
    prepare at least one of a plurality of uncoded packets for transmission on a first one (P1) of the plurality of paths from the source node (S) to a destination node (D); and
    generate a first coded packet for transmission on a second, different one (P2) of the plurality of paths from the source node (S) to the destination node (D), the first coded packet based upon a set of uncoded packets, wherein the set of uncoded packets comprises:
      a next uncoded packet to be transmitted by the source node;
      $\alpha$ previously transmitted uncoded packets where $\alpha$ is an integer equal to or greater than zero; and
      $\beta$ uncoded packets that are to be transmitted after the next uncoded packet where $\beta$ is an integer equal to or greater than zero;
      wherein $\beta$ is determined based on relative delays of the first one (P1) of the plurality of paths and the second one (P2) of the plurality of paths, wherein the sum of $\alpha$ and $\beta$ is greater than zero.

2. The source node of claim 1 wherein the source node processor and a memory are further configured to:
  generate a second coded packet; and
  transmit the second coded packet on a third, different path (P3).

3. The source node of claim 2, wherein the coded packets are evenly distributed to the second path (P2) and the third path (P3).

4. The source node of claim 3, wherein the coded packets are distributed to the second path (P2) and the third path (P3) according to network constraints associated with the second path and the third path.

5. The source node of claim 4, wherein the coded packets and the uncoded packets are distributed to the second path and the third path proportionally to the load of the second and third paths respectively.

6. The source node of claim 1, wherein $\alpha$ is determined according to a relative speedup of the second path.

7. The source node of claim 1 wherein the source node is further configured to use network parameters for transmission of packets across the network, wherein network parameters for the source node include at least one of:
group of packets to be transmitted at any point in time, being defined by $\alpha$ and $\beta$;
information rate;
available paths; and
allocated path loads.

8. The source node of claim 7, wherein the network parameters for a source node are determined at the source node according to externally received information.

9. The source node of claim 8, wherein externally received information include one or more of: (a) channel/path state, (b) network state, (c) destination feedback, and (d) network feedback.

10. The source node of claim 1, wherein the processor and the memory are further configured to:
transmit the at least one of the plurality of uncoded packets on the first one of the plurality of paths from the source node to the destination node; and
transmit the first coded packet on the second, different one of the plurality of paths from the source node to the destination node.

11. A destination node arranged to receive data from one or more source nodes across a network, the network having a plurality of paths between the destination node and the one or more source nodes, the destination node comprising a processor and a memory configured to:
receive at least one of a plurality of original packets associated with a first path;
receive at least one coded packets associated with a second path, the coded packets each being based upon $\alpha+\beta+1$ uncoded packets scheduled for transmission on the first path, wherein $\alpha$ is an integer equal to or greater than zero, $\beta$ is an integer equal to or greater than zero, $\alpha+\beta$ is greater than zero, and $\beta$ is determined based on relative delays of the first and second paths; and
decode the coded packets and retrieve information of original packets based upon information in the coded packets.

12. The destination node of claim 11 wherein the destination node processor and memory are further configured to retrieve information in all of the plurality of original data packets, by decoding the at least one of the coded data packets, without requiring receiving all of the plurality of the original packets over the first path.

13. In a network having a plurality of nodes with at least one of the plurality of nodes corresponding to a source node and at least one of the plurality of nodes corresponding to a destination node, and having a plurality of paths between at least one source node and at least one destination node, in a source node (S), a method for transmitting packets comprising:
preparing at least one of a plurality of uncoded packets for transmission on a first one (P1) of the plurality of paths from the source node (S) to a destination node (D);
generating a first coded packet for transmission on a second, different one (P2) of the plurality of paths from the source node (S) to the destination node (D), the first coded packet based upon a set of uncoded packets, wherein the set of uncoded packets comprises:
a next uncoded packet to be transmitted by the source node;
$\alpha$ previously transmitted uncoded packets where $\alpha$ is an integer equal to or greater than zero; and
$\beta$ uncoded packets that are to be transmitted after the next uncoded packet where $\beta$ is an integer equal to or greater than zero;
wherein $\beta$ is determined based on relative delays of the first one (P1) of the plurality of paths and the second one (P2) of the plurality of paths, wherein the sum of $\alpha$ and $\beta$ is greater than zero.

14. The method of claim 13, wherein the destination node (D) retrieves information of at least one of the set of uncoded packets, by decoding the first coded packet, without receiving the at least one of the set of uncoded packets.

15. The method of claim 13 further comprising:
generating a second coded packet; and
transmitting the second coded packet on a third, different path (P3).

16. The method of claim 15, wherein the coded packets and the uncoded packets are distributed to the second path and the third path proportionally to the load of the second and third paths respectively.

17. The method of claim 13, wherein $\alpha$ is determined according to a relative speedup of the second path.

18. The method of claim 13, wherein the source node is further configured to use network parameters for transmission of packets across the network and wherein the network parameters for the source node include, but are not limited to:
group of packets to be transmitted at any point in time, being defined by $\alpha$ and $\beta$;
information rate;
available paths; and
allocated path loads.

19. The method of claim 18, wherein the parameters for a source node are determined at the source node according to externally-received information.

20. The method of claim 19, wherein externally received information includes to one or more of: (a) a channel/path state, (b) a network state, (c) a destination feedback, and (d) a network feedback.

21. In at a destination node arranged to operate in a multipath system, a method comprising:
receiving at least one of a plurality of original packets associated with a first path;
receiving at least one coded packets associated with a second path, the coded packets each being based upon $\alpha+\beta+1$ uncoded packets scheduled for transmission on the first path, wherein $\alpha$ is an integer equal to or greater than zero, $\beta$ is an integer equal to or greater than zero, $\alpha+\beta$ is greater than zero, and $\beta$ is determined based on relative delays of the first and second paths; and
decoding the coded packets and retrieving information of original packets based upon information in the coded packets.

* * * * *